United States Patent [19]
Mitz

[11] Patent Number: 5,266,034
[45] Date of Patent: Nov. 30, 1993

[54] MULTI-CHANNEL SOUND-RECORDING AND PLAYBACK DEVICE

[76] Inventor: Andrew R. Mitz, 4207 Ambler Dr., Kensington, Md. 20895

[21] Appl. No.: 960,700

[22] Filed: Oct. 14, 1992

[51] Int. Cl.$^5$ ............................................. G09B 19/04
[52] U.S. Cl. ..................................... 434/185; 434/167
[58] Field of Search ............... 434/156, 157, 167, 169, 434/176, 185; 364/419; 381/51

[56]  References Cited
U.S. PATENT DOCUMENTS

| | | | |
|---|---|---|---|
| 4,615,680 | 10/1986 | Tomatis | 434/185 X |
| 4,786,255 | 11/1988 | Hiramatsu et al. | 434/157 |
| 5,219,291 | 6/1993 | Fong et al. | 434/169 X |

*Primary Examiner*—Richard J. Apley
*Assistant Examiner*—Glenn E. Richman

[57] ABSTRACT

A multichannel sound recording and playback device is described, which comprises a integrated circuit memory unit for storing messages, a microphone for feeding messages to the memory unit, a speaker for transmitting messages from the memory unit, message actuation devices uniquely associated with the different messages, and control circuitry (logic gates) for enabling and/or disenabling the memory unit and microphone, and for causing transmission of a given message when that message's actuation device is actuated. A preferred form of memory unit is an electrically erasable read-only analog memory IC chip, which permits very low power consumption (less than 100 microamps) during standby. A method for improving language and communication skills of a child is also described, using the device of the invention with pictures affixed to the message actuation devices.

16 Claims, 3 Drawing Sheets

MULTI-CHANNEL SOUND-RECORDING AND PLAYBACK DEVICE

TECHNICAL FIELD

The present invention relates to electronic devices for recording sounds and playing them back. In particular, the invention relates to lightweight, portable sound-recording and playback devices capable of selectively recording and playing back multiple, brief messages.

BACKGROUND

Devices for electronically recording sound messages and for selectively playing them back are known in several technical fields. Such devices have been used, for example, in music instruction, language education, voice-mail systems, and telephone answering machines. The fields of principal interest contemplated for the present invention are training of retarded children and rehabilitation of handicapped persons.

There is a need for a lightweight, portable sound-recording and playback device having multiple, selectable message channels for use in training therapy for retarded children and for use by severely handicapped persons unable to speak and capable of only slight motor activity. Many retarded children are also impaired in motor ability, so that they fall into both of the foregoing categories.

Retarded children often have severe developmental delays in language skills. In some cases these children are nonverbal. They have minimal receptive language skill, and have virtually no expressive language skill. These children may be mobile and interact knowledgeably with their environment, and show preferences for certain activities or objects, among which they are capable of discriminating, but their ability to express their desires is limited to generalized demonstrations, such as clapping or crying. Conveyance of expressive language skills to the severely retarded is considered a major educational goal.

A typical approach to teaching expressive language skills uses photographs of objects from the child's environment. The photographs are typically of favorite toys or foods. In a preliminary stage of training, the child is shown such a photograph. When the child touches the picture, the actual object is handed to the child as a reward. In this stage of training, the child is positively reinforced for the motor act of touching the picture. In a second stage of training, two pictures are presented simultaneously and the child is encouraged to discriminate between them by selecting one picture. Here, pictures of highly desirable objects may be paired with pictures of less desired or less interesting objects. Each time the child chooses a picture, the depicted object is given to the child. The purpose is to cause the child to associate appropriate picture choices with obtaining the more desirable objects. Establishment of this association represents successful conveyance of a rudimentary, but flexible, expressive language skill. Picture selection provides a critical communication link between a retarded person and his caretakers. It also lays the conceptual groundwork for more advanced communication skills.

So-called "speech feedback" is considered to be a valuable adjunct to the above educational paradigm. See, e.g., L. J. Burkhart, *Using Computers and Speech Synthesis to Facilitate Communicative Interaction With Young and/or Severely Handicapped Children* (1987). Speech feedback utilizes a recorded voice stating the name or meaning of the picture, each time that the child touches the picture. This feedback captures the child's attention, a key element in teaching severely retarded children. Further, the recorded message taps into the child's receptive language capacity via an auditory channel supplementing the visual impression that the picture creates. Because the human brain has different sensory pathways to language centers, use of two independent sensory modalities enhances communication by facilitating semantic comprehension. Thus, combining the auditory modality with the visual one increases the likelihood of transferring the desired lexical meaning to the brain's language centers. See A. S. Gilinsky, *Mind and Brain: Principles of Neuropsychology* (1984).

As B. F. Skinner demonstrated, learning depends on appropriate reinforcement. Learning to discriminate occurs only when a child has the opportunity to make a "wrong" selection and thus receive the less-desirable object, as well as the opportunity to make a "correct" selection. Accordingly, it is necessary to have at least two pictures and two recorded messages, each message being uniquely associated with a different one of the two pictures, for the child to learn to discriminate. Additionally, it is possible to unambiguously quantify progress in training a retarded child by measuring performance in a choice task. In addition, the messages must be changed each time that the pictures are changed. This requires either a large library of prerecorded messages or a quick and easy mechanism for recording new messages. Ideally, training should occur in a variety of daily environments, not just a speech-therapy laboratory. The device, if any, used for training should therefore be portable so that it can also be used away from formal therapy settings, for example, at home or in playgrounds.

Such a device, if available, could also be used as an aid in teaching very young, unretarded children how to speak and to discriminate. Similar considerations are applicable in that context to those discussed above.

Presently available devices in this field are not well adapted to the foregoing use by handicapped persons and retarded or very young children. Devices using moving magnetic tape transports for sound-recording and playback require electric motors. Motors are relatively heavy and consume relatively large amounts of power, making devices containing them neither lightweight nor conveniently portable. Further, moving tape devices are limited to only one message per tape unless special equipment is used to position the tape automatically for each message. Such equipment tends to be costly and/or bulky. Moreover, a tape-positioning device introduces time delays between the activation of the device and message playback, which interfers with the teaching/learning reinforcement function and is also simply inconvenient. Typical portable electronic-storage sound-recording and playback devices either consume significant amounts of battery power between message playbacks or use complex circuitry to regulate power consumption.

Accordingly, such devices have not been available in inexpensive and portable form. There are excellent stand-alone multi-channel (4 to 16 channel) record/playback devices which are now used for voice feedback in language training. But these commercial devices are more elaborate than necessary for two-choice picture training; some are not portable; and they retail for approximately $400 to $1600, making them impractical for individuals and most public institutions. It is believed that no practical commercial device now exists for appropriate two-choice picture training of retarded children, for example, for use at home or playground.

OBJECTS AND SUMMARY OF INVENTION

An object of this invention is to provide a simple, inexpensive, light-weight, portable device for sound-recording and playback. A further object of the invention is to provide such a device that is actuated by means that can readily be used by handicapped persons and children. A further object of the invention is to provide such a device having multiple channels, among whose messages the user of the device discriminates. A further object of the invention is to provide such a device that is battery-operated and has long battery life because it limits power consumption. A further object of the invention is to reduce the number, cost, and complexity of the components of such a device.

The invention described hereinafter uses as a message-storage device an analog EEPROM (electrically erasable, programmable, read-only memory chip) under the control of low-power CMOS logic gates. The arrangement of logic gates described hereinafter assures minimum power consumption between message playbacks.

Messages are recorded—and, more important, played back—under the control of external switching devices, preferably of a momentary-contact, typically called "adaptive switches," designed to be easily actuated by a handicapped person or a child. In the record mode of operation, a recording element such as an electret microphone records a message while the external switching device is actuated. In the playback mode of operation, any momentary activation of the switch causes the entire message to play. Sustained actuation of the switch repeatedly plays the same message. Separate messages are associated with different external switching devices. Recordings made when external switching device A is actuated play back whenever (and only whenever) external switching device A is actuated; recording made when external switching device B is actuated play back whenever (and only whenever) external switching device B is actuated.

DETAILED DESCRIPTION OF INVENTION

General Operation of Device

Figure 1:
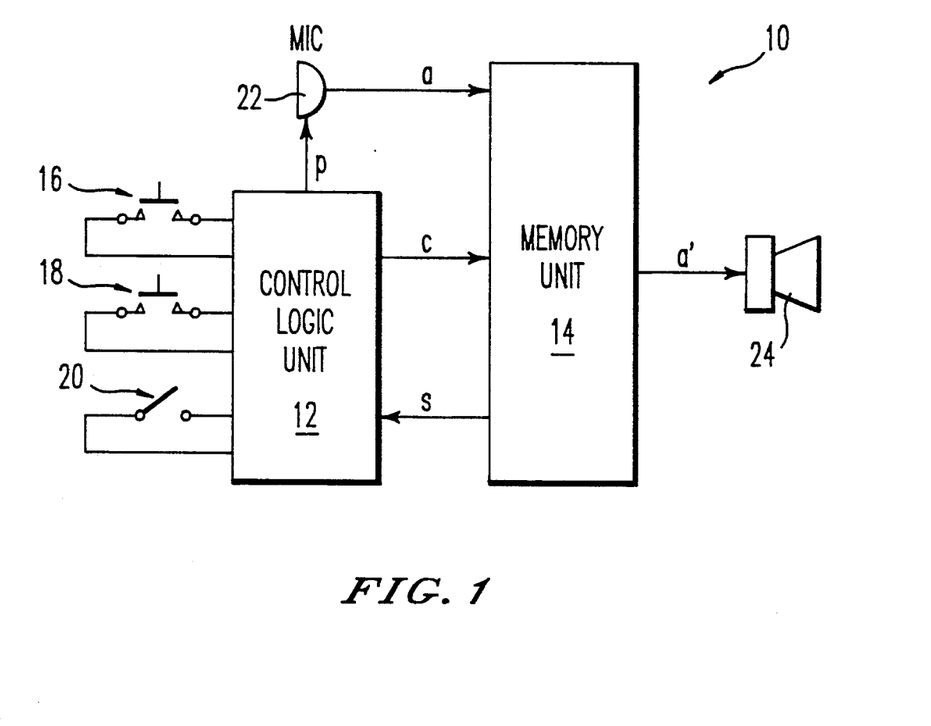
FIG. 1 is a block diagram of the multi-channel sound-recording and playback device, in a two-channel implementation.

Referring to FIG. 1, sound-recording and playback device 10 has two main modules, a control logic unit 12 and a memory unit 14.

Control logic unit 12 receives actuation signals from external, momentary-on, single-pole single-throw (SPST) switches 16 or 18. Unit 12 also receives input signals from a record/playback SPST switch 20 and various status signals s from memory unit 14. Control logic unit 12 controls provision of power p to a microphone 22, providing power only when normally-open play/record switch 20 is closed (record mode). Unit 12 also sends control signals c to memory unit 14.

Control logic unit 12 coordinates actions of memory unit 14, based on the state of switches 16 and 18 and status signals s from the memory unit; minimizes power consumption by interrupting delivery of power p to microphone 22 except when play/record switch 20 is in record mode; and places the memory unit into a power-down ("sleep" or "inactive") mode unless either a message playback is in progress (because SPST switches 16 or 18 have been recently actuated) or play/record switch 20 is closed.

Audio signals a are fed to memory unit 14 during a sound-recording mode. Audio signals a' are played back through a loudspeaker 24 during a sound-playback mode.

For two picture choice applications control unit 12 preferably comprises two 4001BE quad 2-input NOR gate chips and one 4013BE dual R-S flip-flop chip. Memory unit 14 is preferably an ISD1012, ISD1016, or ISD1020 analog memory chip (Information Storage Devices, Santa Clara, Calif.). The ISD1000 series are electrically erasable programmable read-only memory (EEPROM) analog integrated-circuit chips storing 12 to 20 seconds of analog information. The ISD1016, for example, samples analog signals at 8 kHz and stores each sample in one of 128,000 memory cells. Each ISD1000 series chip partitions its memory into 160 segments numbered from address 0, and to address 159. At the beginning of each recording or playback the ISD1000 series chip reads the message starting address from the address lines A0 to A7, and begins storing or playing a message starting at that address. For the two-channel implementation described below, of 8.1 seconds or less is stored starting at address 0 and another message of 7.9 seconds or less is stored starting at address 80. The same chip contains a microphone amplifier, an automatic gain control, an anti-aliasing filter (3.4 kHz), and a 50 mW speaker driver.

The SPST switches should have a large surface-area, to make them easy for handicapped persons and children to operate. An example of such a SPST switch is Toys for Special Children, Inc. (TSPI), Hastings-on-Hudson, N.Y., Model 820, which has a 40 sq. in. contact area. (In some applications other than two-picture training, it is possible to use other adaptive switches designed for handicapped persons, such as sip-and-puff type (such as TSPI Model 970), headswitches (such as TSPI Model 705), or custom adaptive switches.)

Recording occurs when, and continues while, play/record switch 20 is closed and SPST switch 16 or 18 is actuated. (Alternatively, SPST switches 16 and/or 18 can be replaced or supplemented by circuitry, so that their 1 and 0 outputs are provided by logic voltages from appropriate circuitry—typically, approximately 5 vdc and approximately 0 vdc.) When playback/record switch 20 is off, playback is initiated by momentary or continued actuation of momentary-on switches 16 or 18 (or, alternatively, by logic provided voltage). Messages are stored in memory unit 14 at different starting addresses, so that switch 16 calls up one message (for example, a message starting at address 0) and switch 18 calls up another message (for example, a message starting at address 80).

Operation Upon Power-On

Figure 2:
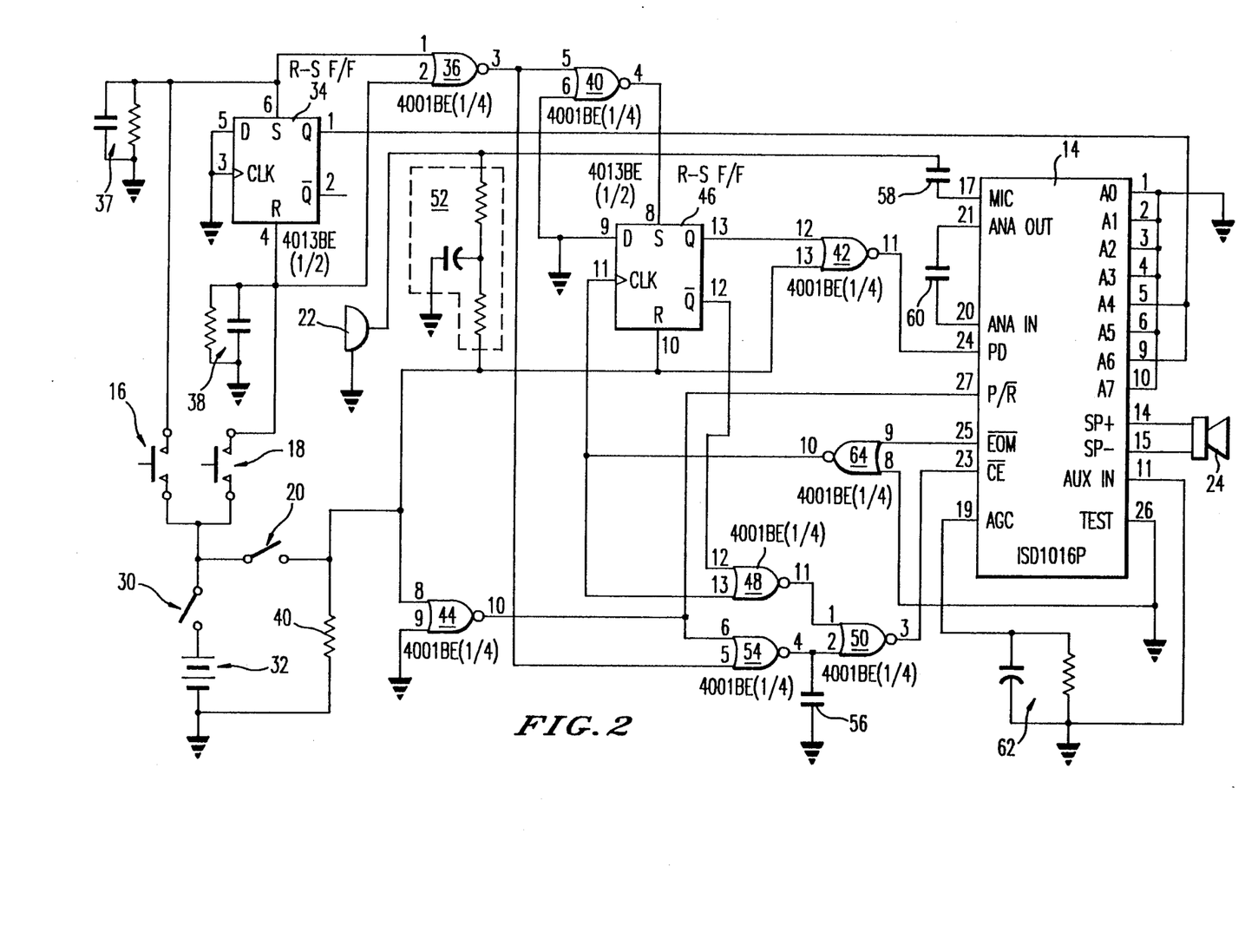
FIG. 2 is a schematic drawing of the multi-channel sound-recording and playback device, in a two-channel implementation.

FIG. 2 shows a schematic drawing of a preferred embodiment of this invention, adapted for two-picture choice applications. When system on/off switch 30 is closed, it connects the positive terminal of negatively-grounded battery 32 (3 AAA cells in series) to the rest of the circuit. Switch 30 functions primarily as a safety device, since power consumption is minimized by the control logic unit. Placing switch 30 in the off-position makes it impossible to actuate the unit accidentally or to record over a message. When switch 30 is placed in the on-position, momentary-on switches 16 and 18 can be actuated, since they are connected on one side to one side of switch 30, whose other side is connected to the positive terminal of battery 32. To minimize noise, a 22 $\mu f$ tantalum electrolytic capacitor should be placed between the positive terminal of the battery and ground; also, for the same reason, at each integrated circuit a 0.1 $\mu f$ capacitor should by-pass any battery power to ground.

Switches 16 and 18 are each connected on one side to switch 30 (and from it to the battery). The other sides of switches 16 and 18 are connected, respectively, to the set and reset inputs of an R-S flip-flop 34, which is part of control unit 12 of FIG. 1. The set and reset inputs of this flip-flop are also connected to the two inputs of a NOR gate 36, so that one side of the NOR gate receives the same switch signal that the set input receives and the other side of the NOR gate receives the same switch signal that the reset input receives. The set and reset inputs of the flip-flop are each also connected to ground via pull-down and debounce networks 37 and 38, which are each advantageously implemented as a parallel resistor-capacitor pair of 100K and 0.1 $\mu f$.

The effect of the signal from switch 16 or switch 18 depends on the state of play/record switch 20. When switch 20 is closed, the device is in the record mode; when switch 20 is open, the device is in the playback mode. A pull-down resistor 40, typically 100K, prevents the logic inputs that are connected to play/record switch 20 from floating when the switch is open.

Record Mode

When play/record switch 20 is closed, memory unit 14 is taken from its power-down (inactive) mode to record mode. This occurs because when switch 20 is closed a "1" signal (approximately +5 vdc) goes to one input of NOR gate 42, making its output go to "0"(approximately 0 v). That signal then feeds to the PD input of memory unit 14, pin 24 of an ISD1016 analog memory chip. The PD input is turned off by the 0 signal from NOR gate 42. At the same time, closure of switch 20 sends a 1 signal to an inverter 44, causing the inverter to feed a 0 signal to the P/$\overline{R}$ input (pin 27) of memory unit 14. That places the chip into record mode. Closure of switch 20 also sends a 1 signal to the reset input of an R-S flip-flop 46.

In addition, closing play/record switch 20 supplies power to microphone 22 via decoupling network 52. Microphone 22 is advantageously an electret microphone, such as Mouser Electronics Corp., Mansfield, Tex., Model 25LM0-40. Network 52 can be implemented as a 2.2 K resistor in series with a 10K resistor, with the junction (common) point of the resistors connected to ground via a 22 $\mu f$ tantalum electrolytic capacitor. The nonjunction end of the 10K resistor is connected to the microphone, and the nonjunction end of the 2.2K resistor is connected to switch 20. Once powered, the electret microphone can send sound information to memory unit 14 for storage. (However, memory unit 14 must be enabled for it to store such inputs.)

As indicated above, when play/record switch 20 is closed, it resets R-S flip-flop 46. The flip-flop's outputs are then directly or indirectly ORed with other active signals. Also, as indicated above, closure of switch 20 also sends the memory unit from a power-down (inactive) mode into an active, record mode because NOR gate 42 turns off the PD input of the ISD1016 chip and inverter 44 sets the P/$\overline{R}$ input of the chip low. Inverter 44 also sets up NOR gate 54 which has access to the $\overline{CE}$ input (pin 23 of the ISD1016 chip) of memory unit 14 through NOR gate 50. Thereafter, actuation of switch 16 or switch 18 will enable memory unit 14 through NOR gate 36 while the switch is actuated (but only at such times). This arrangement causes the duration of the recorded message to be controlled by switches 16 or 18. A capacitor 56, typically 0.001 $\mu f$, briefly delays the enable signal to the memory unit when switches 16 or 18 are first actuated. This delay gives R-S flip-flop 34 time to set up a new starting address in the memory unit before the memory unit is enabled to store a message. The memory unit requires that the address lines A0 through A7 are set with a stable value for at least 300 n sec before the $\overline{CE}$ input goes low.

If a recording on the first channel exceeds approximately 8 seconds in duration, the stored message will cross into the address space of the second channel. This allows the recording of a single 16 second message as long as only one channel is to be used. If also implies that there is no inherent safeguard to prevent overwriting an existing message on the second channel. If a recording on the second channel exceeds 7.9 seconds, only the first 7.9 seconds of the message will be recorded.

Microphone 22 is coupled to the MIC input (pin 17 of the ISD1016 chip) of memory unit 14 via a capacitor 58, a typical value for which is 0.22 $\mu f$. An active or passive filter network 60 located between the ANA IN and ANA OUT pinouts of the memory unit (pins 20 and 21 of the ISD1016 chip) filters the audio signal from microphone 22 before the signal is stored in a location within the memory unit. The filter network may advantageously be merely a 1.0 $\mu f$ capacitor.

The automatic gain control for the memory unit (AGC input, pin 19 of the ISD1016 chip) is regulated by a network 62. It is considered that a fast attack and very slow decay is most suitable for this application. That can be implemented conveniently by making the network a parallel combination of a 1.5 Meg. resistor and a 22 $\mu f$ capacitor (time constant=33 sec).

Playback Mode

Play/record switch 20 is opened to place the device into playback mode. When SPST switch 16 or SPST switch 18 is actuated, the output of NOR gate 36, connected across the lines from the SPST switches, goes to 0. That signal turns on an inverter 40 and sends a 0 to NOR gate 54. Inverter 40 then sets R-S flip-flop 46. The Q output of the flip-flip sends a 1 signal to NOR gate 42, which sends a 0 to the PD input of memory unit 14 (pin 24 of an ISD1016 chip). That makes the memory unit go from a power-down, or inactive, mode to an active mode.

At the same time, the $\overline{Q}$ output of flip-flop 46 initiates a playback by memory unit 14. The $\overline{Q}$ output goes to 0 and passes that signal to NOR gate 48, which passes its output to NOR gate 50, which passes its output to the $\overline{CE}$ input of memory unit 14 (pin 23 of the ISD1016 chip), enabling the memory unit.

Once enabled, memory unit 14 reads the current address settings selected by R-S flip-flop 34 and sends the information stored starting at that address to loudspeaker 24 via the speaker outputs of the memory unit (pins 14 and 15 of the ISD1016 chip). At the end of the message, memory unit 14 sends an $\overline{EOM}$ pulse to an inverter 64. Inverter 64 inverts the pulse and clocks a 0 into R-S flip-flop 46. If neither switch 16 nor switch 18 is actuated at this point, memory unit 14 returns to a power-down mode. If one switch is still actuated flip-flop 46 does not change state. Instead, the inverted $\overline{EOM}$ pulse from inverter 64 makes the memory unit cycle by signalling its $\overline{CE}$ input via the cascade of NOR gates 48 and 50. That has the effect of restarting playback.

The foregoing embodiment can be implemented with 8 NOR gates (some of which are configured as inverters by grounding an input), 2 R-S flip-flops, and one analog EEPROM. That translates into two quad 2-input NOR gate chips (4001BE), one dual R-S flip-flop chip (4013BE), and one ISD1016 or ISD1020—a total of four chips, permitting a compact, lightweight, inexpensive device. The use of CMOS, together with the power-conserving gating arrangements described above, permits long-lived battery operation.

Figure 3:
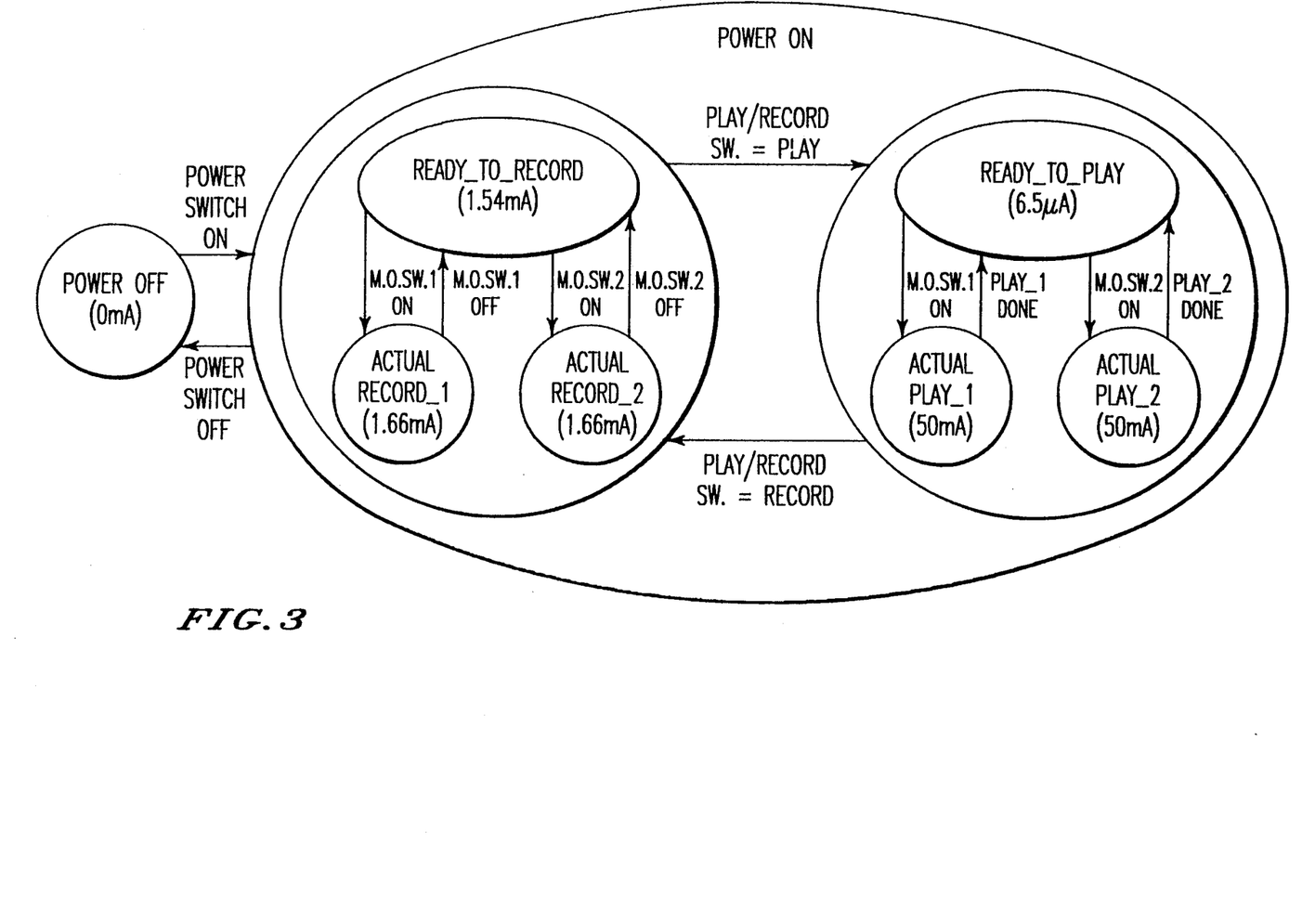
FIG. 3 is a state diagram of the device, showing current consumption for each state or substate.

Referring to FIG. 3, a hierarchal state diagram for the device, it is seen how the switching and gating arrangement conserves current to give the device long-lived battery operation. When the power switch is off, no current is consumed, but the messages are nonetheless retained in memory because the memory unit is nonvolatile. (It is estimated that the ISD1016 and ISD1020 chips can each retain a message for ten years.). When the power switch is on, the device may be in either RECORD_MODE or PLAY_MODE, depending on whether the play/record switch is in play-position or record-position. Each of the principal modes (states) has a ready substate and a plurality of actual-operation substates. Thus, the RECORD_MODE state has a READY_TO_RECORD substate, in which 1.54 ma is consumed, and (here) two ACTUAL_RECORD substates, ACTUAL_RECORD_1 and ACTUAL_RECORD_2, in each of which 1.66 ma is consumed. The PLAY_MODE state has a READY_TO_PLAY substate, in which only 6.5 μa is consumed (less than 0.5% of the RECORD_MODE power consumption and approximately 0.1% of power consumption during playback), and (here) two ACTUAL_PLAY substates, ACTUAL_PLAY_1 and ACTUAL_PLAY_2, in each of which 50 ma is consumed. Transitions from state to state occur upon actuation of the power, play/record, and momentary-on switches, as shown in FIG. 3.

Preprogrammed Device

In the implementation described above, a microphone is permanently wired into the circuit. In an alternative implementation, a microphone is removably coupled to the rest of the apparatus. This permits messages to be preprogrammed for the user, and the user does not utilize a record mode. For such applications, in ordinary use the device has only playback and inactive modes. If only preprogrammed messages are to be used, no externally actuatable switching or circuitry for record-mode is required. The ISD1016 chip may advantageously be socketed instead of soldered, and different messages can be provided by swapping ISD1016 chips.

Use of Device

A prototype unit was built and has been field-tested for more than eight months with a child from the Montgomery County, MD, school system. The unit was built into a 5×3×2 inch plastic box, and weighed 14 ounces. For one 8-second channel, a snap-action microswitch was mounted on top of the box, and was equipped with a paddle to which Velcro-type material was fastened, to facilitate mounting of photographs. Photographs were first mounted on cardboard sheets and Velcro-type material was fastened to the back of the cardboard sheets. The box was equipped with two AUX connectors for operation with stand-alone paddle switches of the same type. One AUX connector permitted a stand-alone paddle switch to usurp control of the box-mounted paddle switch in applications where a separate switch is more convenient. The second AUX connector permitted a stand-along paddle switch to operate the second 8-second channel.

It was found that 3 alkaline AAA cells would operate over 2 months of heavy use. When in playback mode and idle, the unit drew under 10 μA current. However, if the unit was left on and in the record mode, the cells became depleted within 48 hours. Accordingly, a further implementation is contemplated in which the play/record switch is spring-loaded or otherwise adapted to return the switch to the play-position and prevent the device from being left in the record mode by accident. It is estimated that total parts cost was under $100. It is considered that voice quality reproduction was equal to or better than telephone quality.

Speech-feedback therapy was undertaken, in accordance with the methods described in the Background. A description now follows for using the unit for speech-feedback therapy with two picture choices:

Initial training

The student is seated in front of the teacher. The teacher selects an object known to be interesting to the student. The object can be a toy, food, or item used in a favorite activity (for example, a cassette recorder with a musical recording). The teacher is also equipped with a clear photograph of the object. Velcro-type material is used to adhere the photograph to a paddle switch, which is either part of the device or connected to the device. The unit is turned on and placed in the record mode. The teacher records a message appropriate for the picture. A typical message for playing music (associated with a picture of a tape recorder) might be: "Music. I want music." The message should be simple, repetitious of the key element, and be approximately 4 to 6 seconds in duration. The invention is then switched to the play mode and switched off. Switching the unit off prevents accidental playback, which would distract the student from the training.

The object is briefly used for the enjoyment of the student, by giving the student a taste, playing the recorded music, etc. The object is then removed from view and replaced with the photograph mounted on the paddle switch. The unit is turned back on. The student is then encouraged to reach for the photograph. Sooner or later, with the help of the teacher, if necessary, the student will touch the photograph firmly enough to activate the recorded message. In reward for this action, the actual object or activity depicted by the photograph (and message) is once again made available to the student (for example, food given, music played). After a few moments of play with the object or activity, the object is again removed from sight and the picture presentation is repeated. A recorded message, in and of itself, is alluring to most students doing this task. Usually the student is motivated to repeat the act of activating the message without much prompting. Initial training continues until the student reliably reaches for a switch-mounted photograph.

Choice training

Choice training follows much the same paradigm as initial training, except that the student is offered objects or pictures in pairs. The teacher selects two items, one of which is known to be significantly more interesting to the student than the other. Matching pictures are attached to paddle switches and corresponding recordings are prepared as just described. The student is first offered both objects. The student will typically select the more interesting item by reaching for it or turning his head or eyes toward the object. The selected object is then briefly used as with initial training. The activity is stopped, and both objects are removed from the student's view. They are replaced by the two paddle switches with the photographs attached. The unit is turned back on and the student is then encouraged to reach for a photograph. Efforts must be made by the teacher: 1) to permit the touching of only one picture, and 2) to make both pictures equally available. When the student touches a photograph, the paddle switch is activated and the associated message is played. In reward for this action, the actual object or activity depicted by the photograph (and message) is made available to the student (for example, food given, music played). "Incorrect" choices are treated exactly the same as "correct" ones. The objects and their corresponding pictures and messages are changed as necessary to maintain the student's interest in the training. The rapid re-programming capability of the apparatus of this invention allows frequent message changes, as may be needed with younger students.

Eventually the student begins to understand the "rules" of the game (and hence, begins to comprehend expressive language), and reaches reliably for the photograph depicting the desired object. The transition could take many months depending on presence and/or severity of a mental handicap, but success indicates that a hitherto unavailable communications channel has been opened. Lack of communications is arguably the most distressing aspect of severe mental retardation.

Slight modifications to the above procedures are necessary for students who cannot reach, but can activate other types of adaptive switches, for example, head-position switches, eye-position switches, sip-puff switches. In these cases, when objects or pictures (not mounted on switches) are presented, they are positioned to the left and to the right of the student, and each of two actions (for example, look left vs. look right, sip vs. puff) is universally associated with one of the two directions.

CONCLUDING REMARKS

The electronic sound-recorder and playback apparatus described hereinabove provides selective message playback through the use of an easily actuated momentary-on SPST switch, thus permitting handicapped persons and young children to operate it. The device provides lightweight, portable sound-recording and playback. The circuitry limits battery consumption and thus extends battery life. The number, cost, and complexity of the components is kept at a minimum. The device has been field tested and has proved effective in therapy for handicapped persons and retarded children.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, but rather comprehends the subject matter defined by the following claims.

I claim:

1. A lightweight, portable, multi-channel sound-recording and playback apparatus, comprising:
   an integrated-circuit memory unit having means for storing a plurality of different sound messages, each of said messages having a different starting address;
   message-input means coupled to said memory unit, for feeding sound messages to said memory unit;
   message-output means coupled to said memory unit, for transmitting said messages from said memory unit;
   a plurality of message-actuation devices, each of said devices being uniquely associated with a different one of said messages; and
   control means coupled to said memory unit, to said message-input means, and to said message-actuation devices, for:
   enabling and/or disenabling said memory unit;
   enabling and/or disenabling said message-input means; and
   causing transmission, when one of said message-actuation devices is actuated, of the message uniquely associated with that one of said message-actuation devices.

2. An apparatus according to claim 1, wherein said integrated-circuit memory unit is an electrically eraseable read-only analog memory integrated circuit chip.

3. An apparatus according to claim 2, wherein said message-output means is a loudspeaker coupled to a speaker output portion of said integrated circuit chip.

4. An apparatus according to claim 1, wherein said message-input means is integrally coupled to said memory unit.

5. An apparatus according to claim 1, wherein said message-input means is an electret microphone.

6. An apparatus according to claim 1, wherein said message-input means is removably coupled to said memory unit.

7. An apparatus according to claim 1, wherein said message-actuation devices are momentary-on switches.

8. An apparatus according to claim 1:
   further comprising means for providing a record-mode signal and a playback-mode signal, for selecting whether the apparatus shall operate in a record mode or in a play mode;
   wherein said message-actuation devices are associated with means for providing an identification signal identifying which particular actuation device, if any, is being or has been actuated; and wherein said control means comprises:

means for placing said apparatus in a record mode upon reception of a record-mode signal, said means comprising:

means for enabling said message-input means;

means for receiving and decoding said identification signals, thereby registering the identify of which particular message-actuation device, if any, is being actuated;

means for enabling said memory unit to receive a message from said message-input means if and only if one of said message-actuation devices is being actuated; and means for enabling said memory unit to store said message at a starting address associated with the particular message-actuation device, if any, that is being actuated; and means for placing said apparatus in a playback mode upon reception of a playback-mode signal, said means comprising:

means for receiving and decoding said identification signals, thereby registering the identify of which particular message-actuation device, if any, has been actuated since said playback-mode signal was received;

means for enabling said memory unit to read the starting address of the message associated with the message-actuation device, if any, that has been actuated since said playback-mode signal was received;

means for outputting said message; and means for, upon completion of said message:

disenabling said memory unit if no message-actuation device is then being actuated; and recommencing entry of playback mode if a message-actuation device is then being actuated.

9. An apparatus according to claim 1, said apparatus having n said message-actuation devices, each of which is a momentary-on switch having an on-position and an off-position, and said apparatus further comprising:

a play/record switch having a play-position and a record-position;

means for placing and maintaining said apparatus in a RECORD_MODE system state when said play/record switch is in said record-position, said RECORD_MODE state having a READY_TO_RECORD substate and a plurality of ACTUAL_RECORD substates—ACTUAL_RECORD_1, ACTUAL_RECORD_2, ... ACTUAL_RECORD_n—each of said ACTUAL_RECORD substates being uniquely associated with a different one of said momentary-on switches;

means for placing said apparatus in said READY_TO_RECORD substate if:

said apparatus is in said RECORD_MODE state; and each of said momentary-on switches is in an off-position;

means for placing said apparatus in one of said ACTUAL_RECORD substates if:

said apparatus is in said RECORD_MODE state; and the momentary-on switch uniquely associated with said ACTUAL_RECORD substate is in an on-position;

means for placing and maintaining said apparatus in a PLAY_MODE system state when said play/record switch is in said play-position, said PLAY_MODE state having a READY_TO_PLAY substate and a plurality of ACTUAL_PLAY substates—ACTUAL_PLAY_1, ACTUAL_PLAY_2, ... ACTUAL_PLAY_n—each of said ACTUAL_PLAY substates being uniquely associated with a different one of said momentary-on switches;

first transition means for causing a transition from said READY_TO_PLAY substate to one of said ACTUAL_PLAY substates to occur if:

said apparatus is in said READY_TO_PLAY substate of said PLAY_MODE state; and the momentary-on switch uniquely associated with said ACTUAL_PLAY substate is placed in an on-position; and second transition means for causing a transition from said ACTUAL_PLAY substate to said READY_TO_PLAY substate to occur if each of the following conditions is true:

said apparatus is in said ACTUAL_PLAY substate of said PLAY_MODE state, the momentary-on switch uniquely associated with said ACTUAL_PLAY substate is in an off-position; and the message uniquely associated with said momentary-on switch has finished playing.

10. An apparatus according to claim 9 wherein said apparatus has two momentary-on switches, two ACTUAL_RECORD substates, and two ACTUAL_PLAY substates.

11. An apparatus in accordance with claim 10 wherein said memory unit is an analog EEPROM and power consumption in said READY_TO_PLAY substate is less than 100 $\mu$A.

12. An apparatus in accordance with claim 10 wherein said memory unit is an analog EEPROM and power consumption in said READY_TO_PLAY substate is less than 10 $\mu$A.

13. A lightweight, portable, two-channel sound-recording and playback apparatus, comprising:

an electrically erasable, integrated-circuit, analog memory unit having means for storing two different sound messages, each of said messages having a different starting address;

a microphone coupled to said memory unit, for feeding sound messages to said memory unit;

a speaker coupled to said memory unit, for transmitting said messages;

two momentary-on switches, each of which is uniquely associated with a different one of said messages; and logic circuitry for providing a signal identifying which, if any, of said momentary-on switches is being or has been actuated;

a play/record switch for selecting whether the apparatus shall operate in a play mode or in a record mode;

control means coupled to said memory unit, to said microphone, and to said momentary-on switches, said control means comprising:

logic circuitry for causing the apparatus to operate in a record mode when said play/record switch is placed in a record-position, said circuitry comprising:
- a set of gates that feed a signal to the memory unit enabling it to receive a message from the microphone, if and only if one of said momentary-on switches is being actuated;
- a set of gates that feed a signal to the memory unit enabling it to store said message at a starting address associated with the particular momentary-on switch, if any, that is being actuated; and logic circuitry for causing the apparatus to operate in a play mode when said play/record switch is placed in a play-position, said circuitry comprising:
- a set of gates that feed a signal to the memory unit enabling it to read the starting address of the message associated with the particular momentary-on switch, if any, that has been actuated since the play/record switch was placed in a play position;
- circuitry for recalling said message and feeding it to the speaker;
- end-of-message signalling circuitry for, upon completion of said message:
  - disenabling the memory unit if no momentary-on switch is then being actuated; and
  - recommencing entry of playback mode if a momentary-on switch is then being actuated.

14. A method of improving language and communications skills of a child, comprising:
(1) providing the child with access to a lightweight, portable, battery-operated apparatus, comprising:
an integrated-circuit memory unit having means for storing a plurality of different sound messages, each of said messages having a different starting address;
message-input means coupled to said memory unit, for feeding sound messages to said memory unit;
message-output means coupled to said memory unit, for transmitting said message from said memory unit;
a plurality of message-actuation devices, said devices being capable of being actuated by a child, each of said devices being uniquely associated with a different one of said messages; and
control means coupled to said memory unit, to said message-input means, and to said message-actuation devices, for:
enabling and/or disenabling said memory unit;
enabling and/or disenabling said message-input means; and
causing transmission, when one of said message-actuation devices is actuated, of the message uniquely associated with that one of said message-actuation devices;
(2) affixing to each of said message-actuation devices a picture;
(3) programming said memory unit with a plurality of messages, each message being uniquely associated with one of said actuation-devices and with the picture affixed thereto; and
(4) engaging in speech-feedback training.

15. The method of claim 14 wherein said integrated-circuit memory unit comprises an electrically eraseable analog memory chip having a power-down mode in which power consumption of the entire apparatus is less than 100 μA.

16. The method of claim 15 wherein said integrated-circuit memory unit comprises an electrically eraseable analog memory chip having a power-down mode in which power consumption of the entire apparatus is less than 10 μA.

* * * * *